United States Patent
Cottman et al.

(10) Patent No.: US 6,825,302 B1
(45) Date of Patent: Nov. 30, 2004

(54) PROCESS FOR SYNTHESIZING TACKIFIER RESIN

(75) Inventors: Kirkwood Storer Cottman, Akron, OH (US); Ching-Chian Chang, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/648,180

(22) Filed: Aug. 26, 2003

Related U.S. Application Data

(63) Continuation-in-part of application No. 10/458,506, filed on Jun. 10, 2003, now Pat. No. 6,710,147, which is a continuation-in-part of application No. 10/287,914, filed on Nov. 5, 2002, now Pat. No. 6,613,854.
(60) Provisional application No. 60/333,727, filed on Nov. 28, 2001.

(51) Int. Cl.$^7$ .................................................. C08F 4/14
(52) U.S. Cl. ...................... 526/237; 526/291; 526/348; 526/348.6
(58) Field of Search ................................ 526/237, 291, 526/348, 348.6

(56) References Cited

U.S. PATENT DOCUMENTS 3,719,652 A * 3/1973 Oberkirch et al. .......... 526/115
4,060,503 A * 11/1977 Feeney et al. .............. 524/505

* cited by examiner

Primary Examiner—William K. Cheung
(74) Attorney, Agent, or Firm—Alvin T. Rockhill

(57) ABSTRACT

This invention is based upon the unexpected discovery that the reactivity of the most important monomers commonly used in synthesizing tackifier resins with aluminum halide catalysts can be enhanced by conducting the polymerization in the presence of an allylic halide. For instance, the conversions of 2-methyl-2-butene, cis-piperylene, and cyclopentene that are attained in polymerizations that are catalyzed with aluminum halide catalysts are increased by conducting the polymerization in the presence of an allylic halide, such as allyl chloride. Increased monomer conversion is of great commercial importance because it leads to an increased level of efficiency and reactor capacity. The present invention more specifically discloses a process for synthesizing a resin having characteristics that make it particularly useful as a tackifier resin, said process comprising the polymerization of an unsaturated hydrocarbon monomer mixture in the presence of aluminum halide and an allylic halide, wherein the unsaturated hydrocarbon monomer mixture is comprised of unsaturated hyrdocarbon monomers containing from about 4 to about 18 carbon atoms, and wherein said process is conducted in the absence of tantalum compounds. The subject invention further reveals a process for synthesizing a resin having characteristics that make it particularly useful as a tackifier resin, said process comprising the polymerization of an unsaturated hydrocarbon monomer mixture in the presence of aluminum halide and an allylic halide, wherein the unsaturated hydrocarbon monomer mixture is comprised of monomers including but not limited to 2-methyl-2-butene, cis-piperylene, trans-piperylene, cyclopentene, and additional unsaturated hyrdocarbon monomers containing from about 4 to about 18 carbon atoms, wherein said process is conducted in the absence of tantalum compounds.

16 Claims, No Drawings

PROCESS FOR SYNTHESIZING TACKIFIER RESIN

This application is a continuation-in-part application of U.S. patent application Ser. No. 10/458,506, filed on Jun. 10, 2003, now U.S. Pat. No. 6,710,147, which is a continuation-in-part application of U.S. patent application Ser. No. 10/287,914, filed on Nov. 5, 2002, now U.S. Pat. No. 6,613,854, which claims the benefit of U.S. Provisional Patent Application Ser. No. 60/333,727, filed on Nov. 28, 2001.

BACKGROUND OF THE INVENTION

Tackifier resins are commonly made by polymerizing 2-methyl-2-butene and piperylene with additional unsaturated hydrocarbons that contain from about 4 to about 18 carbon atoms. Such tackifier resins are widely utilized in manufacturing pressure sensitive and hot melt adhesives. Pressure sensitive adhesives are used in tapes, labels, adhesive bandages, glue traps for rats and mice, and numerous additional applications. Hot melt adhesives are employed in carton closures, book bindings, film lamination, tires, labels, tapes, packaging, and a wide variety of other products.

Tackifier resins based on hydrocarbon monomers that contain 5 carbon atoms ($C_5$ hydrocarbons) offer unique characteristics that allow them to be used in applications where most other hydrocarbon resins do not adequately perform. Their light color, high tack properties, low specific gravity, oxidative stability and day-to-day consistency of properties make them an excellent choice for use in pressure sensitive adhesives. Pressure sensitive adhesives of this type are normally made by blending the $C_5$ hydrocarbon tackifier resin with a rubbery polymer, such as natural rubber, butadiene-styrene copolymers, butadiene-acrylonitrile copolymers, or a stereo specific polymer of a diene monomer, such as butadiene or isoprene. U.S. Pat. No. 3,846,352 describes pressure sensitive adhesive compositions of this type.

U.S. Pat. No. 4,060,503 discloses a rubber, α-methylstyrene-modified piperylene/2-methyl-2-butene resin adhesive composition which comprises an admixture of (1) about 100 parts by weight of a rubber comprised of at least one of natural rubber, synthetic cis-1,4-polyisoprene elastomer, and an unvulcanized elastomeric styrene/isoprene block copolymer having the general configuration A-B-A wherein each A is an independently selected nonelastomeric styrene polymer block having an average molecular weight of about 2,000 to about 100,000 and a glass transition temperature above about 25° C., the total block A content being from about 10 to about 50 percent by weight of the copolymer, and B is an elastomeric conjugated diene block of polyisoprene having an average molecular weight from about 25,000 to about 1,000,000 and a glass transition temperature below about 10° C., said copolymer having a tensile strength at 25° C. in excess of about 200 pounds per square inch, and (2) about 60 to about 140 parts by weight of a compatible piperylene/2-methyl-2-butene type, thermoplastic tackifying resin, modified with a minor amount of α-methylstyrene containing carbon-to-carbon unsaturation therein and having a softening point in the range of about 80° C. to about 105° C. prepared by the method which comprises reacting in the presence of an aliphatic hydrocarbon solvent and a catalyst selected from at least one of aluminum chloride and ethylaluminum dichloride, a monomer mixture consisting of about 92 to about 99 weight percent of a diolefin/olefin mixture of a weight ratio in the range of about 0.6/1 to about 1.4/1 and, correspondingly, about 8 to about 1 weight percent α-methylstyrene, where said diolefin is at least about 95 weight percent piperylene and said olefin is 2-methyl-2-butene; wherein said diolefin is optionally modified by containing up to about 5 weight percent isoprene and wherein said monomer mixture is optionally modified by containing up to about 10 weight percent of at least one monomer selected from the group consisting of piperylene dimers, piperylene trimers, 2-methyl-1-butene, 2-methyl-2-pentene, 2-methyl-1-pentene, 2,3-dimethyl-1-butene, 2,3-dimethyl-2-butene, 2-methyl-2-pentene, cyclopentene and 1,3-cyclopentadiene.

U.S. Pat. No. 4,288,567 discloses an adhesive composition which comprises an admixture of an unvulcanized block polymer product and a compatible tackifier resin therefor prepared by the method which comprises (A) mixing (1) 100 parts by weight of a solution polymerizate comprised of 100 parts by weight of an unvulcanized block styrene/isoprene polymer product with an overall styrene polymer content in the range of about 10 to 35 weight percent and its polymerization solvent in the range of about 300 to about 1100 parts by weight with (2) about 50 to about 200 parts by weight of a solution polymerizate comprised of 100 parts by weight of a tackifying resin for said block polymer product and its polymerization solvent in the range of about 25 to about 1100 parts by weight and (B) removing said solvent from the prepared mixture prior to its application as an adhesive; wherein the total of said polymerization solvents is a solvent for the combination of said block polymer and said resin; wherein said block polymer polymerizate is produced by the process of contacting isoprene and a suitable amount of divinylbenzene under solution polymerization conditions with a polystyryllithium catalyst, said amount of divinylbenzene being from about 0.5/1 to about 10/1 moles of divinylbenzene per mole of active lithium catalyst; and wherein said tackifier resin polymerizate is prepared by copolymerizing in the presence of a catalyst selected from the group consisting of aluminum chloride, boron trifluoride and boron trifluoride etherate, a mixture of piperylene and at least one olefin containing 4–6 carbon atoms in a diolefin/olefin mole ratio in the range of about 0.6/1 to about 2.5/1, optionally modified by copolymerizing about 5 to about 20 weight percent, based on the total monomers, of at least one additional monomer selected from alpha-methylstyrene and di-cyclopentadiene in which the resin itself has a softening point in the range of about 50° C. to about 150° C.

U.S. Pat. No. 4,172,860 discloses an adhesive composition comprises an admixture of (A) 100 parts by weight of an unvulcanized branched, thermoplastic block polymer product produced by the process consisting essentially of contacting a diolefin selected from the group consisting of at least one of isoprene and 1,3-butadiene premixed with a suitable amount of divinylbenzene, under solution polymerization conditions with a polystyryl lithium catalyst, said amount of divinylbenzene being from about 0.5/1 to about 10/1 moles of divinylbenzene per mole of active lithium catalyst to form said thermoplastic block polymer that is essentially non-gel and has the divinylbenzene coupling agent attached to the diolefinic portion of the block polymer, and (B) about 50 to about 150 parts by weight tackifier therefor; where said tackifier is a resin having a softening point in the range of about 50° C. to about 150° C. and is selected from at least one of terpene resins and synthetic hydrocarbon resins derived essentially as diolefin/olefin copolymers prepared by polymerizing the monomers in the presence of a catalyst selected from aluminum chloride or boron trifluoride or boron trifluoride etherate; and where, in said block copolymer, the polystyrene block molecular weight is in the range of about 8,000 to about 45,000, the polydiolefin block has a molecular weight in the range of about 10,000 to about 100,000, ignoring the divinylbenzene effect, with the overall styrene content in the block copolymer being in the range of 10 to 35 weight percent.

U.S. Pat. No. 3,577,398 is based upon the finding that a mixture of piperylene and 2-methyl-2-butene can be polymerized in the presence of a metal halide catalyst, such as aluminum chloride or stannic chloride, to form a tackifier resin that is useful in commercial applications. U.S. Pat. No. 3,577,398 specifically discloses a polymeric resinous composition comprising from about 40 to about 80 weight percent units derived from piperylene and from about 20 to about 60 weight percent units derived from 2-methyl-2-butene, wherein the resinous composition has a softening point that is within the range of about 80° C. to about 110° C. U.S. Pat. No. 3,577,398 indicates that the polymeric resinous composition can be modified by having up to about 25 weight percent units derived from certain other unsaturated hydrocarbons. The polymeric resinous composition is prepared by polymerizing a mixture comprising from about 20 to about 75 weight percent piperylene and from about 25 to about 80 weight percent of 2-methyl-2-butene in the presence of an anhydrous metal halide selected from aluminum chloride and stannic chloride.

U.S. Pat. No. 3,784,530 and U.S. Pat. No. 3,846,353 disclose a resinous material that is particularly useful as a tackifier for rubbery butadiene-styrene copolymers that has a softening point in the range of 60° C. to about 110° C. that is prepared by polymerizing piperylene, 2-methyl-2-butene, dicyclopentadiene, and α-methylstyrene in the presence of a catalyst selected from the group consisting of aluminum chloride and ethyl aluminum dichloride and a solvent selected from aliphatic and aromatic hydrocarbons.

SUMMARY OF THE INVENTION

This invention is based upon the unexpected discovery that the reactivity of the most important monomers commonly used in synthesizing tackifier resins with aluminum halide catalysts can be enhanced by conducting the polymerization in the presence of an allylic halide. For instance, the conversions of 2-methyl-2-butene, cis-piperylene, and cyclopentene that are attained in polymerizations that are catalyzed with aluminum halide catalysts are increased by conducting the polymerization in the presence of an allylic halide, such as allyl chloride. Increased conversion is of great commercial importance because it leads to reduced cost that is attributable an increased level of efficiency and reactor capacity. The increased conversion of expensive monomers used in making the tackifier resin is of particular benefit. The implementation of this invention also reaps significant environmental benefits in that a greater quantity of monomers are consumed by the polymerization reaction which accordingly leads to the need for disposal of a lower volume of unreacted monomers.

The present invention more specifically discloses a process for synthesizing a resin having characteristics that make it particularly useful as a tackifier resin, said process comprising the polymerization of an unsaturated hydrocarbon monomer mixture in the presence of aluminum halide and an allylic halide, wherein the unsaturated hydrocarbon monomer mixture is comprised of unsaturated hyrdocarbon monomers containing from about 4 to about 18 carbon atoms, and wherein said process is conducted in the absence of tantalum compounds.

The subject invention further reveals a process for synthesizing a resin having characteristics that make it particularly useful as a tackifier resin, said process comprising the polymerization of an unsaturated hydrocarbon monomer mixture in the presence of aluminum halide and an allylic halide, wherein the unsaturated hydrocarbon monomer mixture is comprised of 2-methyl-2-butene, cis-piperylene, trans-piperylene, cyclopentene, and additional unsaturated hyrdocarbon monomers containing from about 4 to about 18 carbon atoms.

In the process of polymerizing an unsaturated hydrocarbon monomer utilizing an aluminum halide catalyst, the present invention generally discloses the improvement which comprises conducting the polymerization in the presence of an allylic halide, wherein said process is conducted in the absence of tantalum compounds.

The process of this invention is normally conducted in the absence of tantalum compounds, such as tantalum halides and tantalum oxyhalides including $TaCl_3$, $TaCl_4$, $TaCl_3$, $TaCl_2$, $TaOCl_3$, $TaBr_5$, $TaOBr_3$, and $TaI_5$. Other tantalum compounds that are normally avoided include salts of tantalum with strong mineral acids, aliphatic and aromatic carboxylic acids, and its alcoholates and β-keto-enolates, for example, tantalum ethylate and tantalum acetyl acetonates.

In some cases it is desirable to hydrogenate the tackifier resin to reduce the level of yellow color and undesirable odors that may be present. In high-end applications it is particularly desirable for the tackifier resin to be hydrogenated since hydrogenation can be used to reduce or eliminate these undesirable characteristics without having an adverse effect on the softening point, molecular weight or the aromaticity of the resin. Palladium on alumina catalyst systems are particularly advantageous for this purpose since they have proven to offer high activity and can be used under mild reaction conditions, such as low reaction temperature and pressure.

The present invention also reveals a process for synthesizing a hydrogenated resin having characteristics that make it particularly useful as a tackifier resin having low odor and low color characteristics, said process comprising the steps of (1) polymerization of an unsaturated hydrocarbon monomer mixture in the presence of aluminum halide and an allylic halide to produce an unsaturated resin, wherein the unsaturated hydrocarbon monomer mixture is comprised of unsaturated hyrdocarbon monomers containing from about 4 to about 18 carbon atoms, and wherein said process is conducted in the absence of tantalum compounds; and (2) hydrogenating the unsaturated resin in the presence of a palladium on alumina catalyst system at a temperature which is within the range of about 120° C. to about 240° C. to produce the hydrogenated resin.

DETAILED DESCRIPTION OF THE INVENTION

The subject invention can be practiced by conducting polymerizations that are catalyzed with aluminum halide in the presence of an allylic halide to enhance the level of monomer conversion. The allylic halides that can be used in the practice of this invention are of the structural formula:

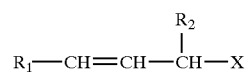

wherein X represents a halogen atom, wherein $R_1$ and $R_2$ can be the same or different, and wherein $R_1$ and $R_2$ represent alkyl groups containing from 1 to about 8 carbon atoms or hydrogen atoms. The halogen in the allylic halide will typically be chlorine or bromine. In most cases the halogen in the allylic halide will be chlorine. $R_1$ and $R_2$ will normally represent a hydrogen atom or an alkyl group containing from 1 to about 4 carbon atoms, such as a methyl group. $R_2$ will normally represent a hydrogen atom.

This invention is generally applicable to any polymerization of an unsaturated hydrocarbon monomer that is catalyzed with aluminum halide, such as aluminum chloride ($AlCl_3$). However, it is of particular utility in the polymerization of mixtures of unsaturated hydrocarbon monomers containing from about 4 to about 18 carbon atoms. For instance, the conversion attained in the polymerization of unsaturated hydrocarbon monomer mixtures with aluminum halide catalysts into tackifier resins can be increased using the technique of this invention. The unsaturated hydrocarbon monomers in such mixtures will typically contain from about 5 to about 8 carbon atoms. The unsaturated hydrocarbon monomers in such mixtures will more typically contain about 5 carbon atoms. The mixture of unsaturated hydrocarbon monomers will frequently contain a substantial amount of 2-methyl-2-butene, cis-piperylene, trans-piperylene, and cyclopentene. In many cases tackifier resins will be made by utilizing a mixture of unsaturated hydrocarbon monomers that contain a total of over 50 weight percent 2-methyl-2-butene, cis-piperylene, trans-piperylene, and cyclopentene as constituents of the mixture. Such unsaturated hydrocarbon monomer mixtures, of course, also include additional unsaturated hydrocarbon monomers. Some common representative examples of additional unsaturated hydrocarbons that can be used include isobutylene, 2-methyl-1-butene, 2,3-dimethyl-1-butene, 2,3-dimethyl-2-beutene, 3,3-dimethyl-1-butene, 1-pentene, 2-pentene, 2-methyl-1-pentene, 2-methyl-2-pentene, 3-methyl-2-pentene, 4-methyl-1-pentene, 4-methyl-2-pentene, 2-hexene, isoprene, cyclohexene, 1-octene, 2-octene, 2-dodecene, 2-octadecene, 2-methyl-1-heptadecene, and 1,3-cyclopentadiene.

The polymerizations of this invention are carried out using the general techniques disclosed in U.S. Pat. No. 3,577,398, U.S. Pat. No. 3,784,530, U.S. Pat. No. 3,872,064, U.S. Pat. No. 4,038,346, and U.S. Pat. No. 4,230,842 with the polymerization, of course, being conducted in the presence of an allylic halide. The teachings of U.S. Pat. No. 3,577,398, U.S. Pat. No. 3,784,530, U.S. Pat. No. 3,872,064, U.S. Pat. No. 4,038,346, and U.S. Pat. No. 4,230,842 are accordingly incorporated herein by reference in their entirety.

The aluminum halide will typically be aluminum chloride and will normally be used in an amount which is within the range of about 0.05 phm (parts per 100 parts by weight of monomer) to about 10 phm. The aluminum halide will more typically be used in an amount that is within the range of about 0.5 phm to about 5 phm, and will normally be used in an amount within the range of about 1 phr to about 3 phm. The aluminum halide will preferably be used at a level of about 2 phm. The aluminum halide will typically be employed as anhydrous particles having a particle size that is within the range of about 5 to about 200 mesh. However, it should be noted that larger or smaller particles of the aluminum halide can be used.

The weight ratio of the aluminum halide to the allylic halide will typically be within the range of about 1:4 to about 50:1. The weight ratio of the aluminum halide to the allylic halide will more typically be within the range of about 1:1 to about 20:1. The weight ratio of the aluminum halide to the allylic halide will preferable be within the range of about 2:1 to about 8:1. The weight ratio of the aluminum halide to the allylic halide will more preferably be about 7:1.

The polymerization reactions of this invention are typically carried out in the presence of a diluent because they are usually exothermic. However, with adequate mixing and cooling the reaction temperature can be controlled and the reaction can accordingly be conducted without the need for a diluent being present. In any case, various liquid organic diluents can be employed in the polymerization. Some representative examples of organic solvents that can be used as diluents include, aliphatic hydrocarbons, such as pentanes, hexanes, and heptanes, and aromatic hydrocarbons, such as benzene, xylene, and toluene. Unreacted residual hydrocarbons from the polymerization reaction can also be allowed to remain in the polymerization mixture and a diluent.

The monomers, organic solvent, aluminum halide, and allylic halide can be added to a polymerization reactor simultaneously or intermittently. The reaction can be conducted continuously, semi-continuously, or by utilizing batch polymerization techniques. In the preparation of tackifier resins, a wide range of temperatures are suitable for the polymerization. For example, the polymerization can be carried out at a temperature that is in the range of about −20° C. to about 100° C. The polymerization is typically conducted at a temperature that is within the range of about 0° C. to about 50° C. The polymerization is more typically conducted at a temperature that is within the range of about 10° C. to about 45° C. The polymerization is preferably conducted at a temperature that is within the range of about 25° C. to about 40° C. However, a temperature will normally be above the freezing point of the reaction system and below its boiling point. Accordingly, the pressure at which the polymerization reaction is being conducted should be taken into consideration when determining the optimum temperature. Normally, the polymerization reaction pressures may be atmospheric or above or below atmospheric pressure. Generally, a satisfactory polymerization is conducted at about autogenous pressure developed under the operating conditions used.

The prepared thermoplastic tackifying resin polymer is conveniently recovered by steam distillation or vacuum distillation to remove volatile unreacted monomers, dimers, trimers, low molecular weight oily polymers, and the like. The thermoplastic tackifying resins will normally have a softening point that is within the range of about 50° C. to about 175° C. as determined by ASTM Method E28-58T and more preferably from about 80° C. to about 130° C. Such tackifier resins also typically have a specific gravity at 25° C. that is within the range of about 0.93 to about 0.99, a glass transition temperature (onset) that is within the range of about 30° C. to 80° C., and are light in color. They are typically derived from aliphatic and alicyclic hydrocarbons, preferably aliphatic hydrocarbons, and therefore contain essentially no units derived from aromatic hydrocarbons. In this regard, it is sometimes preferred that not more than about 5 percent by weight of the units of the tackifying resin are derived from aromatic hydrocarbons and more preferably it is desired that none of the units are derived from aromatic hydrocarbons. In other cases it is desirable to include a vinyl aromatic monomer, such as styrene or α-methyl styrene, in the resin to attain desired characteristics as described in U.S. Pat. No. 4,230,842. Furthermore, it is preferred for the tackifying resin to contain carbon-to-carbon unsaturation therein. Therefore, it is preferred that at least a portion of the hydrocarbons used to prepare the resin have at least two carbon-to-carbon double bonds therein.

In high-end tackifier resin applications it is sometimes desirable for the tackifier resin to be hydrogenated since hydrogenation can be used to reduce or eliminate undesirable odors and the presence of yellow color without having an adverse effect on the softening point, molecular weight or the aromaticity of the resin. Palladium on alumina catalyst systems are particularly advantageous for this purpose since they have proven to offer high activity, long life, and can be used under mild reaction conditions, such as low reaction temperature and pressure. Such hydrogenation procedures are typically conducted in an inert organic solvent using the general procedure described in U.S. Pat. No. 3,701,760. The teaching of U.S. Pat. No. 3,701,760 are incorporated herein with respect to the hydrogenation procedure disclosed therein.

The hydrogenation is typically conducted at a temperature that is within the range of about 120° C. to about 240° C. and at a pressure that is within the range of about 200 psig (pounds per square inch gage) to about 2000 psig. The hydrogenation will more typically be conducted at a temperature that is within the range of about 130° C. to about 200° C. and at a pressure that is within the range of about 300 psig (pounds per square inch gage) to about 1000 psig. The hydrogenation is preferably conducted at a temperature that is within the range of about 140° C. to about 180° C. and at a pressure that is within the range of about 400 psig (pounds per square inch gage) to about 800 psig. The LHSV (liquid hour space velocity) used will normally be less than about 5 and will preferable be within the range of 0.25 to 4. The LHSV will preferably be within the range of 1 to 3.

The tackifier resins made by the technique of this invention can be utilized in manufacturing pressure sensitive and hot melt adhesives. Pressure sensitive adhesives that can be manufactured with such tackifier resins include those used in tapes (including those used to close diapers), labels, adhesive bandages, glue traps for insects and rodents, including rats and mice, fly paper and numerous additional applications. Hot melt adhesives that can be manufactured using tackifier resins made by the process of this invention can be employed in carton closures, book bindings, film lamination, labels, tapes, packaging, product assembly (including in non-woven fabric applications including diapers) and a wide variety of other products. Such adhesives are typically made by blending the tackifier resin with a rubbery polymer, such as natural rubber, butadiene-styrene copolymers, butadiene-acrylonitrile copolymers, or a stereo specific polymer of a diene monomer, such as butadiene or isoprene. U.S. Pat. No. 3,846,352 describes pressure sensitive adhesive compositions of this type. The teachings of U.S. Pat. No. 3,846,352 are incorporated herein by reference in their entirety.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

The resins were prepared in a flask that was equipped with a stirring rod, a thermometer, a water condenser, a feed addition funnel, and a Jack-o-matic® ice cooling bath. In the procedure used 2.0 grams of aluminum chloride ($AlCl_3$) and 5 milliliters of heptane were added to the reaction flask. The feed which contained the allyl chloride was added slowly to the reaction flask over a 1.0 hour period at 30° C. The resin was stirred for 1.0 additional hour and then was neutralized with a 25% aqueous isopropanol solution. The neutralized reaction product was stabilized with 0.10 grams of Irganox® 1010 antioxidant and was subsequently nitrogen stripped to a reactor temperature of 238° C. to remove the unreacted low molecular weight components. A final steam stripping at 238° C. gave the final product with the increased yield. This general procedure was used in the preparation of the resins of this invention.

Materials balance calculations were done on each experimental resin product to determine percent conversion of each reactive component in the feed as compared to the control resin that contained no allyl chloride. Columns 2 and 3 of Table 1 show the name and amount of each component in the feed that was reacted to form the resins. Column 4 shows the percent conversion (Control Reaction) of each component in the feed when allyl chloride was not used. Columns 5 through 11 show the percent conversion of each reactive component in the feed as the amount of allyl chloride was varied from 2.78% to 0.045%.

The most reactive components in the feed are the 2-methyl-1-butene (2MB1), 2-methyl-2-butene (2MB2), cis-piperylene (cis-PIP), and trans-piperylene (trans-PIP). They react relatively well even when an allylic halide, such as allyl chloride, is not used. For instance, with these monomers conversions within the range of 78.2% to 100% are attained without any allylic halide being present. The less reactive components are the trans-2-pentene, cis-2-pentene and the cyclopentene. The conversion of these components was 7.7%, 12.8% and 21.0% respectively in the absence of any allylic halide (see Table 1, column 4). Column 5 shows that the conversion of the trans-2-pentene was increased from 7.7% to 22.4%, the cis-2-pentene from 12.8% to 34.7% and the cyclopentene from 21.0% to 43.2% by adding 2.78% allyl chloride to the feed. Table 1 (column 11) also shows that as little as 0.045% allyl chloride has a positive effect on the conversion of the reactive components in the feed.

TABLE 1

MATERIALS BALANCE SUMMARY SHEET USING 2.0 g AlCl3 AND ALLYL CHLORIDE
(Note: That The % Allyl Chloride Used is Based on 100 Grams Feed)

| 1 R. TIME | 2 COMPONENT | 3 Amount of Each Component Found in 100 g Feed | 4 "Control" No Allyl Chloride Used | 5 2.78% Allyl Chloride in Feed | 6 1.39% Allyl Chloride in Feed | 7 0.69% Allyl Chloride in Feed | 8 0.34% Allyl Chloride in Feed | 9 0.175% Allyl Chloride in Feed | 10 0.085% Allyl Chloride in Feed | 11 0.045% Allyl Chloride in Feed |
|---|---|---|---|---|---|---|---|---|---|---|
| | | | | | | % Conversion | | | | |
| 14.698 | iso-Pentane | 0.1 | 0.0 | 0.0 | 0.0 | 0.0 | 0.0 | 0.0 | 0.0 | 0.0 |
| 17.285 | n-Pentane | 4.2 | 0.0 | 0.0 | 0.0 | 0.0 | 0.0 | 0.0 | 0.0 | 0.0 |

TABLE 1-continued

MATERIALS BALANCE SUMMARY SHEET USING 2.0 g AlCl3 AND ALLYL CHLORIDE
(Note: That The % Allyl Chloride Used is Based on 100 Grams Feed)

| 1 R. TIME | 2 COMPONENT | 3 Amount of Each Component Found in 100 g Feed | 4 "Control" No Allyl Chloride Used | 5 2.78% Allyl Chloride in Feed | 6 1.39% Allyl Chloride in Feed | 7 0.69% Allyl Chloride in Feed | 8 0.34% Allyl Chloride in Feed | 9 0.175% Allyl Chloride in Feed | 10 0.085% Allyl Chloride in Feed | 11 0.045% Allyl Chloride in Feed |
|---|---|---|---|---|---|---|---|---|---|---|
| | | | | | | % Conversion | | | | |
| 20.594 | 2MB1 | 1.1 | 90.0 | 90.9 | 90.9 | 90.9 | 90.9 | 90.9 | 90.9 | 90.9 |
| 21.320 | trans-2-Pentene | 6.5 | 7.7 | 22.4 | 13.8 | 12.3 | 10.8 | 9.2 | 9.4 | 7.7 |
| 22.000 | 2,2-diM-Butane | 1.0 | 0.0 | 0.0 | 0.0 | 0.0 | 0.0 | 0.0 | 0.0 | 0.0 |
| 23.983 | cis-2-Pentene | 4.8 | 12.8 | 34.7 | 27.1 | 25.0 | 22.9 | 17.0 | 19.1 | 14.8 |
| 24.617 | 2MB2 | 22.4 | 78.2 | 86.6 | 83.9 | 85.4 | 85.1 | 83.8 | 83.3 | 82.9 |
| 27.392 | 2-M-Pentane | 1.2 | 0.0 | 0.0 | 0.0 | 0.0 | 0.0 | 0.0 | 0.0 | 0.0 |
| 29.824 | Isoprene &/or Unk | 0.6 | 33.3 | 83.3 | 50.0 | 50.0 | 33.3 | 50.0 | 50.0 | 50.0 |
| 31.420 | cyclopentane | 5.9 | 0.0 | 0.0 | 0.0 | 0.0 | 0.0 | 0.0 | 0.0 | 0.0 |
| 34.942 | cyclopentene | 19.6 | 21.0 | 43.2 | 38.3 | 36.2 | 31.6 | 27.6 | 26.5 | 24.1 |
| 36.446 | trans-PIP | 21.2 | 100.0 | 100.0 | 100.0 | 100.0 | 100.0 | 100.0 | 100.0 | 100.0 |
| 39.792 | cis-PIP | 10.3 | 92.0 | 100.0 | 98.1 | 99.0 | 99.0 | 98.1 | 98.1 | 97.1 |
| 44.210 | cycloPentadiene | 0.2 | 100.0 | 50.0 | 50.0 | 50.0 | 50.0 | 50.0 | 50.0 | 50.0 |
| | YIELD | | 98.9 g | 108.2 g | 109.4 g | 110.0 g | 107 g | 106.4 g | 104.9 g | 103.2 g |
| | SP ° C. | | 101.5° C. | 91.5° C. | 97.5° C. | 99.5° C. | 101.0° C. | 102° C. | 100.5° C. | 100.0° C. |
| | Mw | | 1,750 | 1,250 | 1,350 | 1,390 | 1,450 | 1,380 | 1,580 | 1,600 |

Table 2 displays the same data found Table 1 in a different way. Table 2 shows the % conversion improvement of each reactive component over the control resin which was made in the absense of allyl chloride (Column 4). The data show that the yield and the amount of each reactive component increases as the amount of allyl chloride used is increased from 0.045% to 2.78%.

TABLE 2

Materials Balance Sheet Showing % Conversion Improvement Over Control Where No Allyl Chloride was Used

| 1 R. TIME | 2 COMPONENT | 3 ~Amount of Each Component Found in 100 g Feed | 4 "Control" NO Allyl Chloride Used % Conversion | 5 2.78% Allyl Chloride in Feed % Conversion Improvement | 6 1.39% Allyl CHLORIDE in Feed % Conversion Improvement | 7 0.69% Allyl chloride in Feed % Conversion Improvement |
|---|---|---|---|---|---|---|
| 14.698 | iso-Pentane | 0.1 | 0.0 | | | |
| 17.285 | n-Pentane | 4.2 | 0.0 | | | |
| 20.594 | 2MB1 | 1.1 | 90.0 | 0.0 | 0.0 | 0.0 |
| 21.320 | trans-2-Pentene | 6.5 | 7.7 | (+)14.7% | (+)6.1% | (+)4.6% |
| 22.000 | 2,2-diM-Butane | 1.0 | 0.0 | | | |
| 23.983 | cis-2-Pentene | 4.8 | 12.8 | (+)21.9% | (+)14.3% | (+)12.2% |
| 24.617 | 2MB2 | 22.4 | 78.2 | (+)8.4 | (+)5.7% | (+)7.2% |
| 27.392 | 2-M-Pentane | 1.2 | 0.0 | | | |
| 29.824 | Isoprene &/or unk | 0.6 | 33.3 | (+)50.0% | (+)16.7% | (+)16.7% |
| 31.420 | cycloPentane | 5.9 | 0.0 | | | |
| 34.942 | cyclo-Pentene | 19.6 | 21.0 | (+)22.2% | (+)21.3 | (+)15.2% |
| 36.446 | trans-PIP | 21.2 | 100.0 | 0.0 | 0.0 | 0.0 |
| 39.792 | cis-PIP | 10.3 | 92.0 | (+)8.0% | (+)6.1% | (+)7.0% |
| 44.210 | cyclo-Pentadiene | 0.2 | 100.0 | | | |

| 1 R. TIME | 2 COMPONENT | 8 0.34% Allyl Chloride in Feed % Conversion Improvement | 9 0.175% Allyl Chloride in Feed % Conversion Improvement | 10 0.085% Allyl Chloride in Feed % Conversion Improvement | 11 0.045% Allyl Chloride in Feed % Conversion Improvement |
|---|---|---|---|---|---|
| 14.698 | iso-Pentane | | | | |
| 17.285 | n-Pentane | | | | |
| 20.594 | 2MB1 | 0.0 | 0.0 | 0.0 | 0.0 |
| 21.320 | trans-2-Pentene | (+)3.1% | (+)1.5% | (+)1.7% | 0.0 |
| 22.000 | 2,2-diM-Butane | | | | |
| 23.983 | cis-2-Pentene | (+)10.1% | (+)4.4% | (+)6.3% | (+)2.0% |
| 24.617 | 2MB2 | (+)6.9% | (+)5.6% | (+)5.1% | (+)4.7% |
| 27.392 | 2-M-Pentane | | | | |
| 29.824 | Isoprene &/or unk | 0.0 | (+)16.7% | (+)16.7% | (+)16.7% |
| 31.420 | cycloPentane | | | | |

TABLE 2-continued

Materials Balance Sheet Showing % Conversion Improvement Over Control Where No Allyl Chloride was Used

| | | | | | |
|---|---|---|---|---|---|
| 34.942 | cyclo-Pentene | (+)10.6% | (+)6.6% | (+)5.5% | (+)3.1% |
| 36.446 | trans-PIP | 0.0 | 0.0 | 0.0 | 0.0 |
| 39.792 | cis-PIP | (+)7.0% | (+)5.7% | (+)5.7% | (+)4.7% |
| 44.210 | cyclo-Pentadiene | | | | |

Example 12

Allyl bromide was also found to be an effective co-catalyst for aluminum chloride ($AlCl_3$) in the formation of hydrocarbon resins. A resin was prepared the same as described in Table 1, Column 8 except that the 0.34% (i.e. 0.009 mole) allyl chloride was replaced by 0.54% (i.e. 0.009 mole) allyl bromide. The resulting 105.7 grams of product had a weight average molecular weight (Mw) of 1,420 and a softening point (SP) of 97.5° C. Hence, allyl chloride and allyl bromide appear to be equally effective as the aluminum chloride co-catalyst in the preparation of hydrocarbon resins.

Example 13

This experiment is the same as that shown in Table 1, Column 8 except that 0.34% 1-chloropropane was added to the feed in place of the 0.34% allyl chloride. Two grams of aluminum chloride and 5 milliliters of heptane were added to the reactor. The feed, which was the same as that used in Table 1 except that it contained 0.34% 1-chloropropane, was added at 30° C. over a one hour period. The reaction product was stirred an additional hour at 30° C. and then neutralized with a 25% isopropyl alcohol solution. The product was stabilized with 0.10 g Irganox 1010 antioxidant and was then nitrogen stripped to 238° C. A final steam stripping at 238° C. gave 103.0 grams of a resin with a Mw of 1,550 and a SP of 103.0° C. The saturated 1-chloropropane had some activity as a co-catalyst, but was not as effective as when an equivalent molar amount of the allyl chloride was used in Table 1, Column 8.

Example 14

A resin with a piperylene/2-methyl-2-butene ratio of 2.63 and containing 7.3% alpha-methylstyrene was also prepared using 220 grams of feed and 2.0 grams of aluminum chloride catalyst by the same procedure described above. The resin yield of this control reaction was 118.9 grams. The resin Mw was 1,850 and the SP was 97.0° C.

Example 15

Experiment 14 was repeated, except that the feed used also contained 0.34% allyl chloride. The resin yield was 126.4 grams, the Mw 1,610 and the SP was 97.5° C. The data thus demonstrate that the addition of as little as 0.34% allyl chloride to the resin Feed resulted in a 6.3% increase in resin yield. The added allyl chloride caused 6.7% more trans 2-pentene, 9.2% more cis 2-pentene, 0.7% more 2MB2, 10.1% more cyclopentene and 0.9% more cis piperylene to be converted to resin product.

Example 17

A resin was made to demonstrate that the allyl halide co-catalyst can be added to the reactor along with the aluminum chloride before the addition of the feed. In the procedure used 2.0 grams of aluminum chloride and 5 milliliters of heptane was added to the reactor. Next a solution of 0.69 grams allyl chloride in 5 milliliters of heptane was added to the reactor. The 200 grams of feed (same as that shown in Table 1, column 3) was next added at 30° C. over a one hour period. The reaction product was allowed to react for one additional hour and then neutralized and stripped to 238° C. using the procedures described above. The 105.3 grams of isolated resin had a weight average molecular weight of 1,690 and a softening point of 104.5° C. Hence, the allyl halide co-catalyst can be added prior to the addition of the feed or along with the feed while realizing an increase in product yield.

Comparative Example 18

The same reaction vessel as described above was used. In this experiment 2.0 grams of aluminum chloride and 5 milliliters of heptane was added to the reactor. A 200 gram feed mixture with a piperylenes/2-methyl-2-butene ratio of 1.40 and containing 2.78% allyl alcohol was added to the reactor at 30° C. After 26 minutes when 50% of the geed had been added the reaction temperature was 26° C. Thus, it was not exothermic. Then, 1.0 gram of additional aluminum chloride was added and the reaction temperature rose to 40° C. and then dropped back to room temperature with no exotherm. The addition of the remaining feed over a 30 minute period, caused no exotherm. The addition of 2.0 grams of additional aluminum chloride again caused an exotherm to 40° C. followed by a temperature decrease back to room temperature. Each time the additional aluminum chloride was added a little hydrochloric acid (HCl) evolved from the reactor. After stirring the reactor contents for an additional 80 minutes, the reaction product was neutralized as described above. The neutralized product was nitrogen stripped to 238° C. in the presence of 0.10 grams Irganox 1010 antioxidant and then steam stripped until 20 milliliters of condensate was collected. The 40 grams of semi solid product had a Mw of 950.

The MW of the product was 950 and the 40 g yield was 60% less than that obtained for the control reaction shown it Table 1, Column 4 above. Hence, the 2.78% allyl alcohol in the feed was very detrimental to the aluminum chloride catalyst, where as the addition of 2.78% allyl chloride (see Table 1, Column 5) caused a 8.2% increase in product yield.

Comparative Example 19

Using the same equipment described above allyl ether was evaluated as an aluminum chloride co-catalyst. Then 2.0 grams of aluminum chloride and 5 milliliters of heptane were added to the reactor. The feed used was the same as that used in Table 1, except that the 200 grams feed contained 0.695% allyl ether. The feed was added over a one hour period at 30° C. The reaction product was stirred for one additional hour and then neutralized in the same manner as described above. The neutralized reaction product was stabilized with 00.10 g Irganox 1010 and then nitrogen stripped to 238° C. to remove the low molecular weight volatiles. The resin was then steamed stripped at 238° C. while collecting 56 grams of steam condensate. The resin yield was 56.7 grams, the Mw was 1,660 and the SP was 94.0° C.

The resin yield was 43.3% less then that obtained for the control reaction in Table 1, Column 4 where no co-catalyst was used. Hence, the allyl ether had a detrimental effect on the aluminum chloride catalyst.

Example 20

A hydrocarbon resin having a softening point of 94.5° C., a Gardner color of 2.3, and a yellowness index of 17.7 was hydrogenated as a 30 percent solution in hexane with a palladuim on alumina catalyst at a temperature of 160° C., a pressure of 600 psig, and a LHSV of 2.2. After hydrogenation the resulting resin had a softening point of 96.0° C., a Gardner color of less than 1.0, and a yellowness index of 3.5. In addition to improving the color the hydrogenation also essentially eliminated odor from the resin.

Example 21

A $C_5$ hydrocarbon resin having a softening point of 105.0° C., a Gardner color of 6.5, and a yellowness index of 70.3 was hydrogenated as a 30 percent solution in hexane with a palladuim on alumina catalyst at a temperature of 140° C., a pressure of 600 psig, and a LHSV of 2.67. After hydrogenation the resulting resin had a softening point of 103.5° C., a Gardner color of 2.2, and a yellowness index of 17. In addition to improving the color the hydrogenation also essentially eliminated odor from the resin.

Example 22

A $C_5$ hydrocarbon resin having a softening point of 97.0° C., a Gardner color of 1.8, and a yellowness index of 14.6 was hydrogenated as a 30 percent solution in hexane with a palladuim on alumina catalyst at a temperature of 140° C., a pressure of 600 psig, and a LHSV of 2.14. After hydrogenation the resulting resin had a softening point of 96.0° C., a Gardner color of less than 1.0, and a yellowness index of 1.8. In addition to greatly improving the color the hydrogenation also essentially eliminated odor from the resin.

While certain representative embodiments and details have been shown for the purpose of illustrating the subject invention, it will be apparent to those skilled in this art that various changes and modifications can be made therein without departing from the scope of the subject invention.

What is claimed is:

1. A process for synthesizing a hydrogenated resin having characteristics that make it particularly useful as a tackifier resin having low odor and low color characteristics, said process comprising the steps of (1) polymerization of an unsaturated hydrocarbon monomer mixture in the presence of aluminum halide and an allylic halide to produce an unsaturated resin, wherein the unsaturated hydrocarbon monomer mixture is comprised of unsaturated hyrdocarbon monomers containing from about 4 to about 18 carbon atoms, and wherein said process is conducted in the absence of tantalum compounds; and (2) hydrogenating the unsaturated resin in the presence of a palladium on alumina catalyst system at a temperature which is within the range of about 120° C. to about 240° C. to produce the hydrogenated resin.

2. A process as specified in claim 1 wherein the hydrogenation step is conducted at a pressure that is within the range of about 200 psig to about 2000 psig.

3. A process as specified in claim 2 wherein said unsaturated hydrocarbon monomer mixture is comprised of 2-methyl-2-butene.

4. A process as specified in claim 2 wherein said unsaturated hydrocarbon monomer mixture is comprised of cis-piperylene.

5. A process as specified in claim 2 wherein said unsaturated hydrocarbon monomer mixture is comprised of 2-methyl-2-butene, cis-piperylene, and cyclopentene.

6. A process as specified in claim 2 wherein the aluminum halide is aluminum chloride.

7. A process as specified in claim 2 wherein the allylic halide is allyl chloride.

8. A process as specified in claim 6 wherein the aluminum chloride is present at a level within the range of 0.05 phm to about 10 phm.

9. A process as specified in claim 8 wherein the allylic halide is allyl chloride and wherein the weight ratio of the aluminum chloride to the allyl chloride is within the range of about 1:4 to about 50:1.

10. A process as specified in claim 9 wherein the aluminum chloride is in the form of anhydrous particles having a particle size that is within the range of about 5 to about 200 mesh.

11. A process as specified in claim 10 wherein the polymerization step is conducted at a temperature that is within the range of about 0° C. to about 50° C. and under autogenous pressure; and wherein the hydrogenation step is conducted at a temperature which is within the range of about 130° C. to about 200° C. and a pressure which is within the range of about 300 psig to about 1000 psig.

12. A process as specified in claim 8 wherein the aluminum chloride is present at a level within the range of 0.5 phm to about 5 phm and wherein the weight ratio of the aluminum chloride to the allyl chloride is within the range of about 1:1 to about 6:1.

13. A process as specified in claim 12 wherein said unsaturated hydrocarbon monomer mixture is comprised of 2-methyl-2-butene, cis-piperylene, and cyclopentene.

14. A process as specified in claim 13 wherein the aluminum chloride is present at a level within the range of 1 phm to about 3 phm and wherein the weight ratio of the aluminum chloride to the allyl chloride is within the range of about 2:1 to about 8:1.

15. A process as specified in claim 14 wherein the hydrogenation step is conducted at a temperature that is within the range of about 10° C. to about 45° C.; and wherein the hydrogenation step is conducted at a temperature which is within the range of about 140° C. to about 180° C.

16. A process as specified in claim 15 wherein the hydrogenation step is conducted at a pressure which is within the range of about 400 psig to about 800 psig.

* * * * *